United States Patent [19] [11] 3,730,053
Trocme [45] May 1, 1973

[54] ANTI-SKID BRAKE CONTROL AND ACTUATOR ASSEMBLY

[75] Inventor: Claude M. Trocme, Birmingham, Mich.

[73] Assignee: Eaton Yale & Towne Inc., Cleveland, Ohio

[22] Filed: May 5, 1971

[21] Appl. No.: 141,060

Related U.S. Application Data

[62] Division of Ser. No. 805,155, March 7, 1969, Pat. No. 3,586,386.

[52] U.S. Cl. ..................................................91/469
[51] Int. Cl. ..............................................F15b 13/04
[58] Field of Search ..........................91/469; 92/82; 137/493.1, 493.6, 493.9, 512.1

[56] References Cited

UNITED STATES PATENTS

| 1,844,795 | 2/1932 | Rossman | 137/493.6 |
| 2,167,721 | 8/1939 | La Brie | 137/493.9 X |
| 2,905,097 | 9/1959 | Johnson | 92/82 |
| 3,195,567 | 7/1965 | Cummings | 137/493.6 X |
| 3,277,793 | 10/1966 | Cumming et al. | 91/469 X |
| 3,385,062 | 5/1968 | Cadmus | 137/493.6 |

*Primary Examiner*—Irwin C. Cohen
*Attorney*—Yount & Tarolli

[57] ABSTRACT

An anti-skid brake system includes a control and actuator assembly operable to relieve the pressure in at least a portion of the brake system in response to the vehicle encountering a skid condition. The control and actuator assembly includes an actuator unit having a control member movable to relieve the brake pressure and a servomotor operable to effect the movement thereof. The servomotor includes a pressure operated member having a normal position and which is movable therefrom in response to a pressure differential acting on the opposite sides thereof. The pressure operated member is connected with the control member so that these members move together. A control valve controls the pressure on one side of the pressure operated member and applies atmospheric pressure to the one side of the pressure operated member when the pressure operated member is in its normal position. The control valve is operable in response to the receipt of a skid signal to apply a vacuum to the one side of the pressure operated member. A pressure responsive valve controls the pressure on the other side of the pressure operated member and is responsive to movement of the pressure operated member.

1 Claim, 7 Drawing Figures

ANTI-SKID BRAKE CONTROL AND ACTUATOR ASSEMBLY

This is a division of application Ser. No. 805,155 filed Mar. 7, 1969, now U.S. Pat. Ser. No. 3,586,386.

The present invention relates to a control and actuator assembly for use in an anti-skid vehicle brake system, and particularly relates to a control and actuator assembly operable to relieve the pressure in certain brakes of a vehicle upon the vehicle wheels associated with those brakes encountering a skid condition.

Anti-skid brake systems which have an actuator unit which is operable to relieve the pressure in the brakes associated with the skidding wheels of the vehicle are known. Such a system must be capable of operating extremely rapidly to relieve the brake pressure in the brakes associated with the skidding wheels of the vehicle to relieve the skid condition, and also must operate rapidly to return the brakes to an operative condition when the skid condition has been alleviated. In terms of brake-line pressure, the actuator unit must rapidly decrease the pressure in response to a skid signal and rapidly increase the brake pressure when the skid condition has been relieved. Moreover, it is extremely advantageous in such systems to provide a slow final build-up of brake pressure when the wheels are going from a rolling condition with approximately adequate torque to a locked condition.

The present invention provides an anti-skid control and actuator assembly which is capable of providing a rapid decrease in brake-line pressure in response to a skid signal, and a rapid increase of brake-line pressure when the skid has been relieved. This is effected in the present invention by a control member which when moved in one direction, relieves the brake pressure in the brake lines, and when moved in the opposite direction, effects an increase in the brake pressure in the brake lines. The control member of the actuator unit is moved upon movement of a pressure responsive member to which it is connected. The pressure on one side of the pressure responsive member is controlled by a control valve which is operable to apply a vacuum on the one side of the pressure responsive member in response to the receipt by the control valve of a skid signal from a suitable sensing device. The pressure on the other side of the pressure responsive member is controlled by a pressure responsive valve which is moved to apply atmospheric pressure to the other side of the pressure operated member in response to movement of the pressure operated member.

The pressure responsive valve which controls the pressure on the other side of the pressure operated member is constructed so as to rapidly apply atmospheric pressure to the other side of the pressure operated member as the pressure operated member moves in a brake-line pressure decreasing direction in response to the application of a vacuum on the one side thereof. As a result, this prevents any retarding of the pressure operated member due to the establishment of a vacuum on the other side of the pressure operated member which may be caused by movement thereof. Likewise, when the pressure operated member is moving in a brake-line pressure increasing direction, the pressure responsive valve provides for the rapid expulsion of fluid or pressure from the other side of the pressure operated member. This provides a rapid return of the pressure operated member which, in turn, provides a rapid increase in the pressure in the brake line.

The prior art does not provide an actuator and control unit constructed in accordance with the above. The efforts of the others known to applicant have been directed to initially applying a vacuum to the pressure operated member, and controlling the venting of that vacuum in order to effect movement of the pressure operated member for purposes of decreasing brake-line pressure.

The present invention provides a control and actuator assembly in which a vacuum is applied to the actuator unit to effect movement of the pressure operated member for brake pressure relief, as opposed to the venting of the pressure operated member. Moreover, a pressure responsive valve operates to provide for a rapid response of the pressure operated member.

Objects and advantages of the present invention will be apparent to those skilled in the art to which it relates from the following detailed description of a preferred embodiment thereof made with reference to the accompanying drawings in which.

The present invention provides an improved control and actuator assembly for use in an anti-skid brake system. The control and actuator assembly is associated with a sensing means for sensing a skid condition and which sensing means controls the control and actuator assembly for relieving the pressure in the brakes in response to the skid signal. The control and actuator assembly embodying the present invention may be embodied in different types of brake systems for automotive vehicles and trucks, and may be of a variety of constructions, as described hereinbelow.

Figure 1:
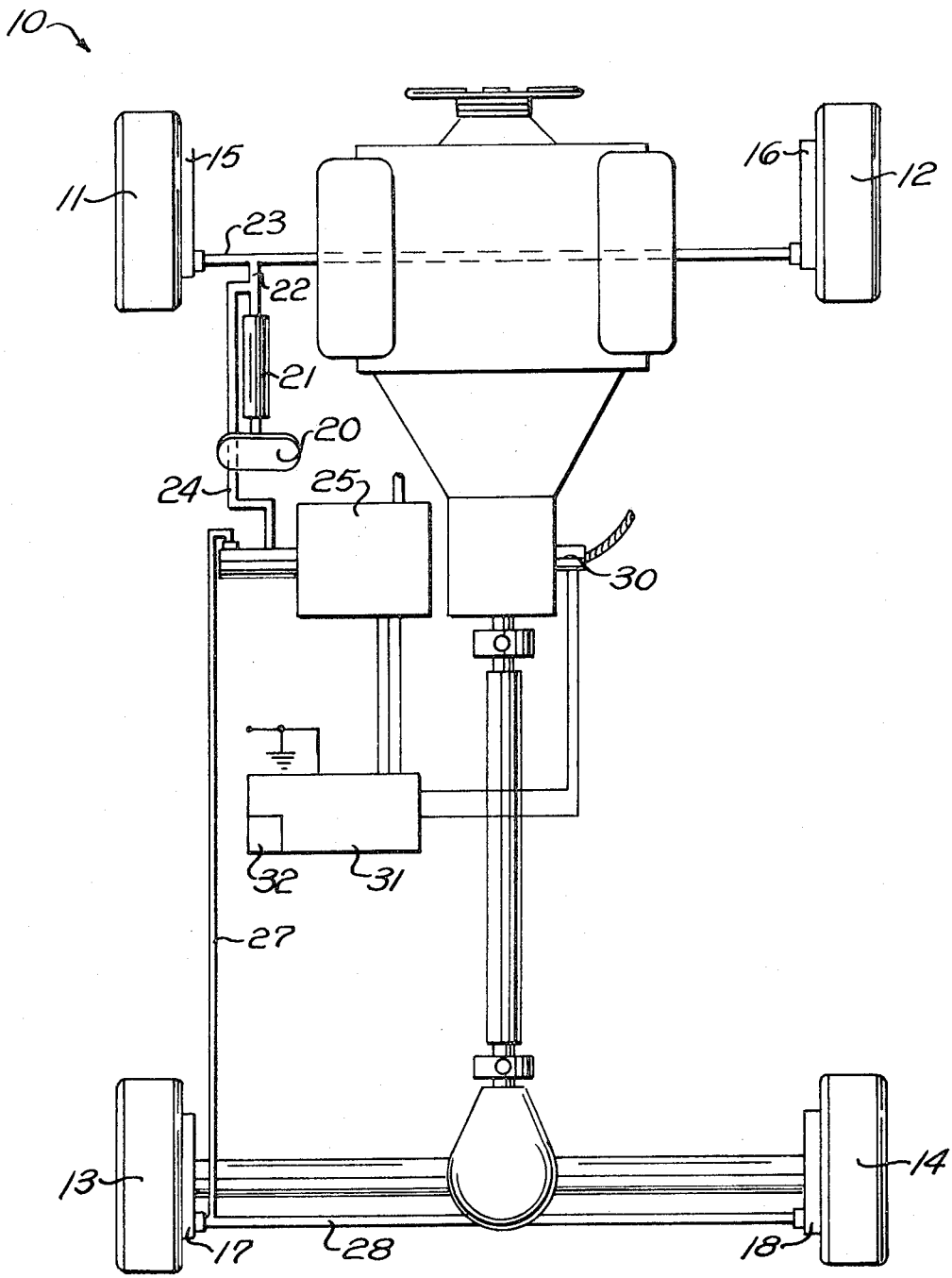
FIG. 1 is a schematic view of an automotive vehicle anti-skid brake system embodying the present invention.

Referring to FIG. 1 of the drawings, a schematic brake system for a vehicle 10 is there illustrated. The vehicle 10 illustrated in FIG. 1 includes front wheels 11, 12, and rear wheels 13, 14. Brake mechanisms 15, 16 are associated with the front wheels 11, 12, respectively, and brake mechanisms 17, 18 are associated with the rear wheels 13, 14, respectively. When actuated, the brake mechanisms 15–18 apply a braking torque to the wheels 11–14 in order to effect braking of the vehicle. All of the brake mechanisms 15–18 are actuated upon depression of a brake pedal 20 of the vehicle and are pressurized from a master cylinder 21 which is actuated upon actuation of the brake pedal. The brake mechanisms 15–18 may be of any conventional form and will not be described herein in detail.

When the brake pedal 20 of the vehicle 10 is depressed, the master cylinder 21 is energized and fluid is directed to the brake mechanisms 15, 16 and to the brake mechanisms 17, 18, respectively. The fluid directed to the front brake mechanisms 15, 16 is directed from the master cylinder 21 through the schematically illustrated conduits 22, 23. The fluid directed to the rear brake mechanisms 16, 17 is directed from the master cylinder through a conduit 24 and into a control and actuator assembly 25 which is interposed between the master cylinder 21 and the rear brake mechanism 17, 18. The fluid flows from the control and actuator assembly 25 through conduits 27, 28 as illustrated schematically in FIG. 1, to actuate the brake mechanisms 17, 18.

The specific construction of the control and actuator assembly functions as a proportioning valve to direct an amount of fluid to the brake mechanisms 17, 18, until the pressure therein reaches a predetermined magnitude, and then controls further flow of fluid to the brake mechanisms 17, 18 so as to provide further increases in pressure in the front brake mechanisms 15, 16 without a corresponding increase in pressure in the rear brake mechanisms 17, 18. As a result, a greater braking effort is provided by the brake mechanisms 15, 16 than is effected by the brake mechanisms 17, 18.

The assembly 25 also forms a part of an anti-skid system for relieving the pressure in the rear brake mechanisms 17, 18 when a skid condition is sensed. The anti-skid system, more specifically, includes a sensing means 30 which senses the average speed of rotation of the rear wheels 13, 14 and is in the form of a tachometer generator. The sensing means 30 could also respond to the speed of one wheel being higher or lower than the other. The sensing means 30 applies a signal to a circuit 31 which is described and claimed in copending application Ser. No. 792,405, filed Jan. 21, 1969, and now abandoned, assigned to the assignee of the present application. The signal from the tachometer generator 30 is compared with a signal from an accelerometer circuit 32, which signal is also applied to the control circuit 31. The accelerometer circuit 32 provides a signal which is indicative of the linear speed of the vehicle and the tachometer generator 30 provides a signal which is indicative of the average rotational speed of the rear wheels 13, 14. When these two signals correspond, there is no output signal from the control circuit 31. However, if the signals do not properly compare, there is an output signal from the control circuit 31.

In the event that the average speed of rotation of the rear wheels 13, 14 would decrease, as would occur in the case of one of the wheels or both of the wheels locking up and skidding, the speed of the vehicle, as determined by the accelerometer circuit 32, would indicate that the rotational speed of the wheels should be higher than what is actually sensed by the tachometer generator 30. In this case, the control circuit 31 is designed to apply a control skid signal to a control valve 35 which forms a part of the assembly 25. The control valve 35, upon receiving a skid signal from the circuit 31, operates to apply a vacuum to a proportioning actuator 36 which also forms a part of the assembly 25. The proportioning actuator 36 then operates to increase the volume of the fluid system for actuating the rear brake mechanisms 17, 18. When this volume is increased, the pressure in the brake mechanisms 17, 18 is reduced, thus relieving the braking effect on the wheels 13, 14 and restoring the wheels 13, 14 to a rotational speed eliminating the skid condition.

Figure 2:
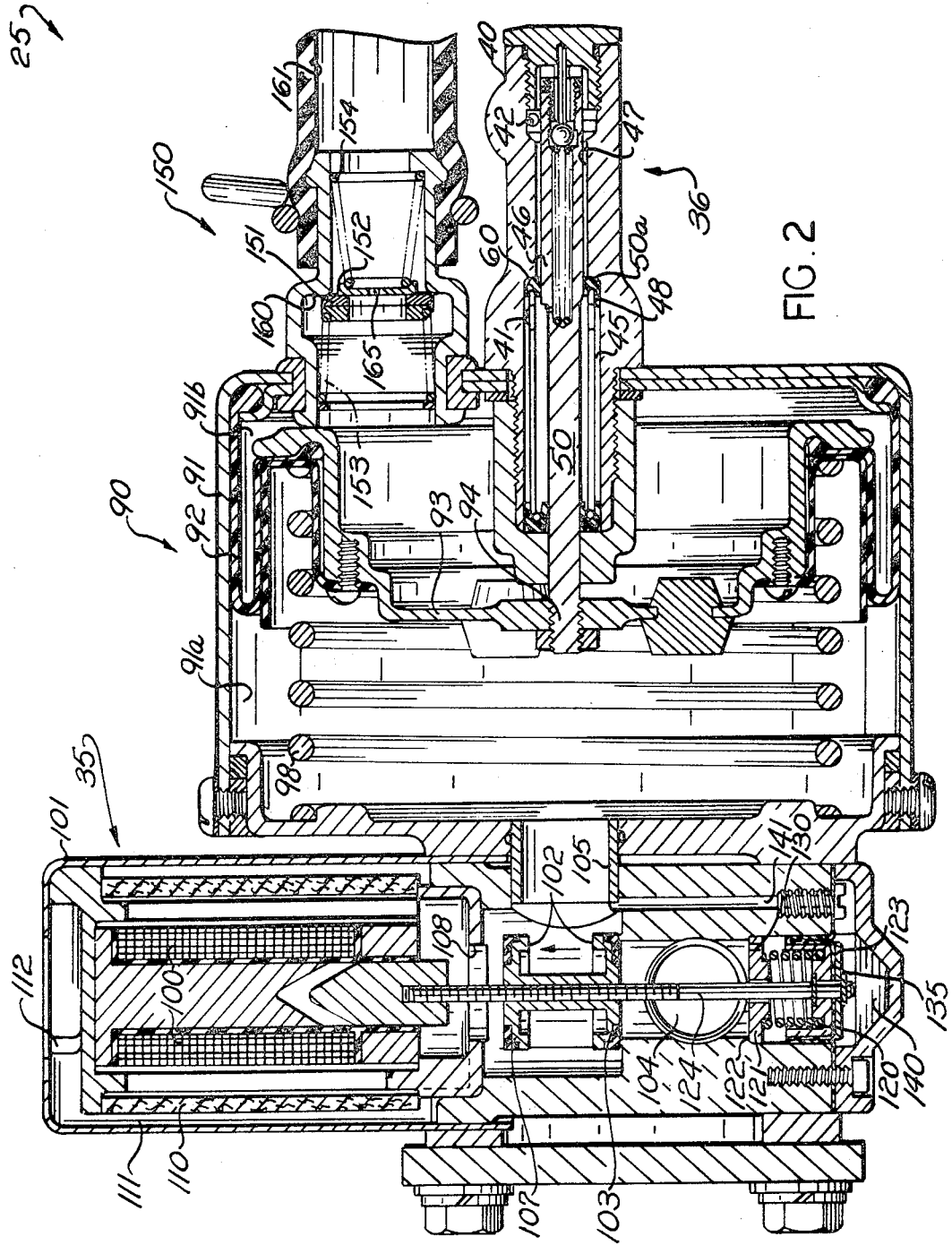
FIG. 2 is a sectional view of a control valve and actuator assembly used in the brake system of FIG. 1.
Figure 3:
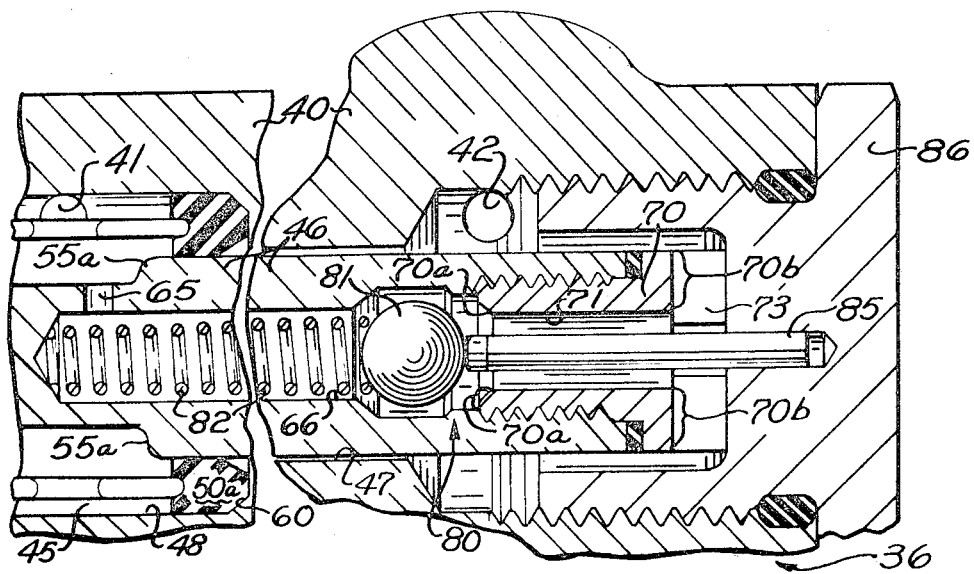
FIG. 3 is a fragmentary sectional view on an enlarged scale of a portion of a control valve and actuator assembly of FIG. 2.

The actuator 36 may be of a variety of constructions. The specific construction thereof does not form a part of this invention, and is identical to the actuator disclosed and claimed in Trocme application, Ser. No. 792,405, filed Jan. 21, 1969, and now abandoned, assigned to the assignee of the present invention. Reference may be made to the Trocme application for details thereof. For purposes of this application, the actuator 36 is illustrated in FIGS. 2 and 3.

The actuator 36 includes a housing 40 having a brake fluid inlet 41 which is adapted to be connected by the conduit 24 to the master cylinder 21. The housing 40 also has a brake fluid outlet 42 which is adapted to be connected by the conduit 27 to actuate the rear brake mechanisms 17, 18. The housing 40 has an axially extending chamber 45 therein and a movable control member 46 is located in the chamber 45. The chamber 45 is defined by a bore 48 which communicates with a smaller bore 47 and forms a shoulder 60 therewith. The member 46 is a generally cylindrical member having a base portion 50 at one end thereof located in the bore 48, and a seal 50a prevents fluid from leaking past the outer diameter of the member 46 from the bore 48 into the bore 47.

The fluid inlet 41 communicates with the chamber 45. The fluid which is directed into the chamber 45 is directed from the chamber 45 through an opening 65 provided in the control member 46 and into a chamber 66 contained within the member 46. The chamber 66 is partially closed by a member 70 which is suitably threaded into an opening in the end of the control member 46. The member 70 has a central opening 71 therethrough through which fluid in the chamber 66 can flow therefrom. The fluid, which flows from the chamber 66 through the opening 71, flows into an end chamber or an outlet chamber 73 in the housing 40. The outlet chamber 73 communicates with the outlet 42 which, in turn, communicates with the conduit 27 for delivering actuating fluid to the rear brake mechanisms 17, 18.

The actuator 36 includes a valve means, generally designated 80, for controlling the flow of fluid to the rear brake mechanisms 17, 18. The valve means 80, as illustrated, comprises a valve member 81 in the form of a ball which is located in the chamber 66 and which is biased by a spring 82 toward the member 70. The valve member 81 when it engages the member 70, closes the opening 71 and blocks the flow of fluid therethrough. As shown in FIG. 3, the valve member 81 is held in an open position relative to the member 70 by a pin member 85 which is carried on an end wall 86 of the actuator 36 and which end wall 86 closes the bore 47 and also defines the end wall of the outlet chamber 73 of the actuator 36. The valve means 80 may take many different forms, and could comprise a fixed valve member other than one which moves with the member 46. Various valve modifications will not be described. The operation of the valve means 80 will be described hereinbelow.

The actuator 36 also includes a servomotor or vacuum actuating mechanism, generally designated 90, for effecting movement of the member 46 in order to relieve a skid condition, as noted above. The vacuum actuating mechanism 90 includes a housing 91 which is suitably secured to the housing member 40 so as to provide an integral unit therewith. The housing 91 defines a chamber therein which is divided into two chamber portions 91a, 91b by, in part, a flexible diaphragm 92. The flexible diaphragm 92 is suitably connected to a plate member 93 located centrally of the actuating mechanism 90. The plate member 93 is connected in a suitable manner to a stem 94, which stem in turn is connect with the base portion 50 of the control member 46. It should be apparent from the above that upon movement of the diaphragm 92, the member 46 will be moved in the chamber 45.

A suitable spring 98 is located in the vacuum actuating mechanism 90 and acts between a portion of the housing 91 and the plate 93 and biases the diaphragm 92 and plate 93 toward the right, as viewed in FIG. 2, which in turn biases the control member 46 toward the right and to the position illustrated in FIG. 2, in which position the valve means 80 is open. The chamber portion 91a on the left side of the diaphragm 92 is associated with the control valve 35 and has a vacuum applied thereto upon opening of the control valve 35, as will be described hereinbelow. When the vacuum is applied to the chamber portion 91a, the bias of the spring 98 is overcome by the vacuum and the member 46 is pulled toward the left due to the action of the vacuum. Since the pressure on the opposite sides of the member 93 controls the movement thereof this may be termed a pressure operated member.

When the vehicle is moving but the brakes are not being applied, the spring 98 biases the member 93 and control member 46 toward the right, as viewed in FIG. 2, so that the pin member 85 holds the valve member 81 in an open condition, as illustrated in FIG. 2. This may be termed the normal position thereof. When the brake pedal 20 of the vehicle is depressed, fluid is forced from the master cylinder 21 through the conduit 24 and into the chamber 45 in the actuator 36. The fluid flows from the chamber 45 through the opening 65 in the control member 46 and into the chamber 66. The fluid then flows through the opening 71 in the member 70, and into the outlet chamber 73. From the outlet chamber 73, the fluid flows through the outlet 42 to the conduit 27 and is thus directed to actuate the brake mechanisms 17, 18.

As the fluid pressure in the system increases, the fluid pressures acting on the member 46 tending to cause movement of the member 46 tends to increase. The fluid pressures acting on the member 46 tending to urge the member 46 to the right, as viewed in FIG. 2, are, in effect, the fluid pressures in the chamber 45 acting on an annular surface or shoulder 55a thereof. The surface area on which the pressure in the chamber 73 acts, namely, 70b and center hole 71, is greater than the surface area in which the pressure tending to move the control member 46 to the right acts, namely, surface 55a. As a result of this unbalance of surface areas as the pressure in the system increases, there is a net increase in force caused by the pressure increase tending to move the member 46 to the left, as viewed in FIG. 2. When this net force resulting from the pressure increase in the system increases sufficiently to overcome the bias of the spring 98, the control member 46 is forced to the left, as viewed in FIG. 2.

When the control member 46 moves to the left, the valve member 81 moves away from the pin 85 and is then biased by the spring 82 into engagement with the member 70, closing the opening 71 therethrough. This isolates the system for the rear brake mechanisms 17, 18 and, therefore, further pressure increases cannot be effected in the chamber 73 due to flow of fluid from the master cylinder 21 until valve means 80 opens again. In this manner, therefore, further depression of the brake pedal of the vehicle will further pressurize the front brake mechanisms 15, 16 of the vehicle and no further increases in pressure will be effected in the rear brake mechanisms 17, 18 until valve means 80 opens.

It should be apparent that as the pressure in the front brake mechanisms continues to increase, the pressure in the chamber 45 will correspondingly increase. If this pressure increases sufficiently to overcome, in combination with the bias of the spring 98, the pressure in the chamber 73, the control member 46 will again move to the right and back to the position illustrated in FIG. 2, in which fluid may be directed to the rear brakes. Thus, it should be apparent that the member 46, as the master cylinder is pressurizing the brake system, will tend to oscillate in order to provide the proper control of fluid pressure in the rear brakes in proportion to the front brakes. More specifically, the actuator 36 operates to enable pressurization of the rear brake mechanisms 17, 18 in proportion to the pressurization of the front brake mechanisms. In order to provide the necessary pressure differentials and proportions between the front and rear brakes, all that it is necessary to do is to provide the proper surface areas against which these pressures act, and to select the proper spring rate for the spring 98. By making these proper selections, the pressure in the rear brakes can be accurately and effectively controlled in proportion to the pressure in the front brakes. From the above, it should be apparent that the actuator 36 provides a proportional control which permits the equal pressure application to both the front brakes and the rear brakes of the vehicle up to a certain pressure, and above the certain pressure, further increases in pressure are effected in the front brakes of the vehicle with only a proportional increase in the rear brakes. This is well known as ideal for braking of a vehicle due to the fact that the weight of the vehicle tends to shift forward during braking and that the front brakes of the vehicle, therefore, are required to perform the greater amount of braking of the vehicle.

As noted hereinabove, the actuator 36 not only acts as a proportioning valve so as to properly control the pressure in the rear brakes with respect to the pressure in the front brakes and to proportion the pressure in the rear brakes with respect to the pressure in the front brakes, but also is operable to relieve the pressure in the rear brake mechanisms 17, 18 when a skid condition is sensed. As noted hereinabove, when a skid condition is sensed, the valve 35 is opened to apply a vacuum to the chamber 91a of the actuator 36. When the vacuum in the chamber 91a is sufficient to overcome the forces acting on the member 46, the member 46 will be moved to the left. This movement is effected by the vacuum in the chamber 91a and is effected independently of the brake fluid pressures acting on the control member 46. In the event that the member 46 is in a position where the valve means 80 is open, such as shown in FIG. 2, or if the member 46 is in the position where the valve means 80 is closed, the control member 46 will be moved to the left. When the member 46 is moved sufficiently, the valve mechanism 80, if it was not closed, closes in order to isolate the rear brake system for the brake mechanisms 17, 18 from the master cylinder 21 and from the front brake mechanisms 15, 16.

After the hydraulic system for the rear brake mechanisms 17, 18 has been isolated, the volume of that hydraulic system is then increased due to the movement of the member 46 to the left which causes an increase in the volume of chamber 73. When the volume of chamber 73 is increased, the entire volume of the fluid system for the brake mechanisms 17, 18 is increased. This increase in volume causes a reduction in the pressure therein, which, in turn, reduces the braking effect applied to the rear wheels of the vehicle, and thereby relieves the skid condition. Once the skid condition has been relieved and the control circuit 31 senses that the angular rotation of the rear wheels 13, 14 is appropriate with respect to the linear velocity of the vehicle as sensed by the accelerometer circuit 32, the valve 35 is actuated so as to vent the chamber 91a to atmosphere, permitting the spring 98 and pressure in chamber 45 to thereby move the control member 46 back to the position in which it was initially, so as to cause a re-application of the rear brakes if the brake pedal is still depressed.

The control valve 35 which receives the signal from the skid circuit 31 and controls the pressure in the chamber 91a on one side of the diaphragm 92 and member 93 of the actuator 36 includes an electrical coil 100 suitably supported in a housing 101. The coil 100 is associated with a valve member 102. The valve member 102 moves upon energization of the coil 100 to control the pressure in the chamber 91a.

The valve member 102 includes a valve part 103 which controls the communication between a vacuum conduit 104 and an outlet conduit 105 of the valve 35. The outlet conduit 105, of course, communicates with the chamber 91a. The member 103 moves in a vertical direction, as viewed in FIG. 2, upon energization of the coil 100, and the vacuum pressure is communicated to the chamber 91a from the vacuum conduit through the conduit 105. This, of course, causes the member 93 in the actuating mechanism 90 to move to the left to relieve the pressure in the brakes, as described hereinabove.

The valve member 102 also includes a valve part 107 which moves relative to a port 108. The port 108 communicates with the atmosphere through filter member 110, a passageway 111, and an opening 112 in the upper portion of the valve 35, as viewed in FIG. 2. When the coil 100 is energized, the valve member 107 moves toward the valve port 108 to block or restrict the communication of the atmosphere with the chamber 91a.

The valve parts 103 and 107 are biased to the position shown in FIG. 2 by a spring 120. The spring 120 acts between a member 121 which is engaged on a shoulder 122 of the housing of the valve 35 and a member 123 which is secured to the stem 124 which carries the valve parts 103 and 107. In order to prevent a difference in pressure being applied on the opposite sides of the member 121, a suitable port 130 is provided in the member to communicate the pressure on one side of the member to the other side thereof. As viewed in FIG. 2, the spring 120 biases the member 123 and the stem 124 downwardly so that the valve part 103 closes or blocks communication between the vacuum conduit 104 and the outlet conduit 105. When the valve 35 is in this condition, atmosphere is directed through the port 108 and into the chamber 91a, and the member 93 is in its normal position as discussed above due to the bias of spring 98.

The member 123 is suitably associated with a diaphragm member 135 which is secured to the member 123. The diaphragm member 135, of course, flexes upon movement of the stem 124 and the member 123. A chamber 140 is provided on the lower side of the diaphragm member 135, as viewed in FIG. 2. A suitable feedback of vacuum or pressure is directed into the chamber 140 through a passage 141 in the housing of the valve 35. The conduit 141 communicates with the outlet passage 105 of the valve 35 and with the chamber 140 to apply the outlet pressure of the valve 35 to the chamber 140. A screw member is located in the passage 141 to control the degree of communication between the passage 141 and the chamber 140. In this manner, as a vacuum is building up in the outlet 105, the application of the vacuum to the underside of the diaphragm 140 results. The purpose of the feedback hole is to provide a large return force to the valve when the current to the solenoid 100 is turned off. The valve itself is unbalanced in the on position in which vacuum is applied to the actuator.

Moreover, because of the port 130, a vacuum pressure is applied on the upperside of the member 123 which is substantially the same as that on the underside, and as a result, there is minimal resistance to movement of the member 123 due to the creation of a vacuum or a pressure beneath or above the member 123 in the chamber 140 upon movement of the member 123 in either direction.

As noted hereinabove, when a vacuum is applied to the chamber 91a, the member 93 moves to the left in a brake pressure relieving direction and the member 46 operates as described above to relieve the pressure in the brakes. In order to insure that there is an extremely rapid response by the member 93 to the creation of a vacuum in the chamber 91a, a pressure responsive venting valve mechanism, generally designated 150, is provided as a part of the control and actuator assembly 25 to control the pressure in the chamber 91b. The pressure responsive valve 150 comprises a pair of valve members 151, 152 which have an abutting relationship, as shown in FIG. 2. The valve member 151 is biased to the right by a spring 153 and the valve member 152 is biased to the left by a spring 154. The positions of the valve members as illustrated in FIG. 2 are such that the member 152 is biased into engagement with the member 151. In the position shown in FIG. 2, the member 151 is in engagement with a valve seat 160. The valve seat 160 defines a port in communication with the atmosphere through a suitable conduit 161. The springs 153, 154 are relatively light springs which allow the members 151, 152 to move in response to fluid pressures acting thereon.

Figure 4:
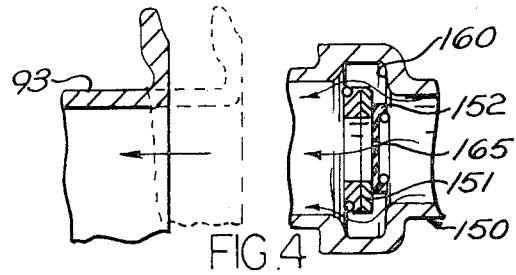
FIGS. 4, 5 and 6 illustrate different operative positions of a pressure responsive valve structure which forms a part of the control valve and actuator assembly.
Figure 5:
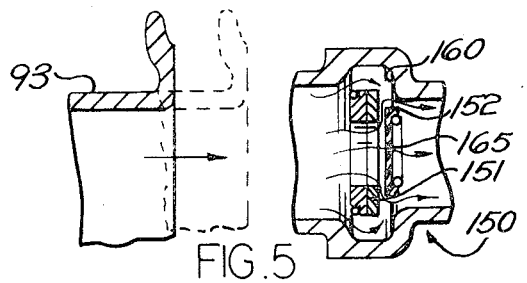
Figure 6:
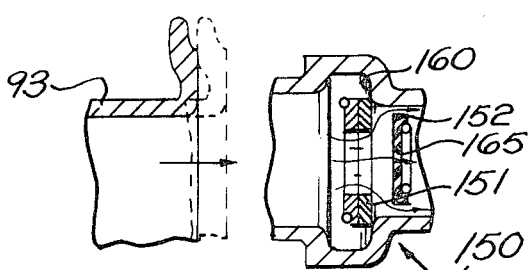

When the member 93 is in its normal position, as illustrated in FIG. 2, the member 152 enables atmospheric pressure to be applied to the chamber 91b through an opening 165 therein. The opening 165 is a relatively small opening. When the member 93 moves to the left, as viewed in FIG. 2, creating a reduction in the pressure in the chamber 91b, the valve members 151, 152 move to the left as a unit away from the valve seat 160 and to a position such as shown in FIG. 4. The dotted line position of member 93 in FIGS. 4, 5 and 6 is a schematic representation of the normal position thereof. This movement of the valve members 151, 152 increases the area of the atmospheric opening in communication with the chamber 91b. As a result, a greater amount of atmospheric pressure is applied to the chamber 91b, which prevents the establishment of a vacuum therein and thus assists or allows the member 93 to move at an extremely rapid rate to the left. The arrows in FIG. 4 indicate atmospheric pressure flowing into chamber 91b. This allows a rapid response for a rapid release of the brake pressure in the brake pressure lines.

When the skid condition is relieved due to the release of the brake or release of the brake pressure in the brake lines, the member 93 moves to the right. This movement to the right by the member 93 is effected as the result of the control valve 35 moving to block vacuum communication with the chamber 91a and venting the chamber 91a to the atmosphere through port 108, as described above. As the member 93 moves to the right the pressure in the chamber 91b tends to increase and the pressure responsive valve 150 operates to reduce the atmospheric communication with the chamber 91b. FIG. 5 illustrates the position of the member 93 and the members 151, 152 of the pressure responsive valve 150, when the member 93 is moving in a brake pressure increasing stroke. As shown in FIG. 5, the member 152 has moved away from the member 151 and fluid in the chamber 91b readily vents through the valve seat 160 around the member 151 and around the member 152 as shown by arrows in FIG. 5. This allows a great volume of fluid to be exhausted to the atmosphere from the chamber 91b as the member 93 is moving in a brake pressure increasing stroke. This results in an extremely rapid return of the member 93 toward its normal position. This rapid movement of the member 93 in the brake pressure increasing stroke results in the pressure in the brake lines increasing in an extremely rapid rate. As the member 93 continues to move from the position shown in FIG. 5 to the position shown in FIG. 6, the member 151 eventually strikes the valve seat 160 blocking further flow around the member 151. However, the ember 152 can move away from the member 151, as shown in FIG. 6, to allow for fluid to continually be exhausted from chamber 91b at a high rate.

When the pressure in the chamber 91b becomes sufficiently low so as to allow the spring 154 to return the valve member 152 into engagement with the member 151, further flow of fluid from the chamber 91b is at an extremely slow rate through the opening 165 in the member 152. As a result, the last increment of movement of the member 93 in the brake pressure increasing direction is at a slower rate, causing a slow pressure increase in the brake lines. This enables the brake pressure to be increased through the wheel locking stage at a very slow rate.

Figure 7:
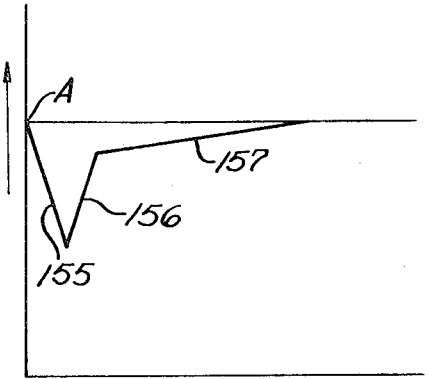
FIG. 7 is a graph of the brake-line pressure as a function of time illustrating in a general way the fluctuation of the brake pressure in the brakes when a skid condition is encountered.

This rapid reduction in the brake pressure, rapid increase in the brake pressure, and slow increase in the brake pressure can be readily visualized upon reference to FIG. 7. FIG. 7 constitutes a graphical representation of the brake pressure in the brake lines with respect to the time. The A indicates when a vacuum is initially applied to the chamber 91a, and initially the brake pressure reduces at an extremely rapid rate, as indicated by the line 155, until the skid condition is relieved and then increases at an extremely rapid rate, as indicated by the line 156. This rapid decrease and increase in the brake pressure with respect to time is effected by the combination of the vacuum control valve 35 applying the vacuum to the chamber 91a and the pressure responsive valve 150 which provides for a variable venting of the chamber 91b and a variable communication with the atmosphere for the chamber 91b. As indicated graphically by the line 157 on FIG. 7, the pressure in the brake lines then increases at a slower rate so that the wheels are brought slowly through the lock-up stage due to the opening 165 in the member 152. It should be apparent that by controlling the spring rates and areas of the members and springs of the pressure responsive valve 150, the pressure in chamber 91b can be effectively controlled so that the operational characteristics of the assembly can be varied.

I claim:
1. An assembly comprising:
   A. a movable member
   B. a motor to effect movement of said control member, said motor including
      1. a housing, and
      2. a pressure operated member dividing said housing into two chambers, said pressure operated member having
         a. a normal position, and
         b. means connecting said pressure operated member to said control member; C. means for applying atmospheric pressure to one of said chambers to effect said normal position of said pressure operated member and for applying a vacuum to said one of said chambers to effect movement of said pressure operated member from said normal position thereby effecting movement of said control member; and
   D. an air pressure responsive valve for controlling air pressure changes in said other chamber, said air pressure responsive valve including
      1. a first valve member with a passage means therein providing continuous atmospheric communication to said other chamber, said first valve member being movable to effect an increase in the atmospheric communication with said other chamber when the air pressure in said other chamber exceeds the atmospheric pressure by a first predetermined amount,
      2. a valve seat on said housing, and
      3. a second valve member engageable with said valve seat and in an abutting relationship with said first valve member when said movable member is in said normal position, said second valve member being movable to effect an increase in the atmospheric communication with said other chamber when the air pressure in said other chamber is less than the atmospheric pressure by a second predetermined amount, and
4. first biasing means acting on said first valve member to effect said abutting relationship with said second valve member, and second biasing means acting on said second valve member to effect said engagement with said valve seat.

* * * * *